US008595387B2

(12) United States Patent
Piwonka

(10) Patent No.: US 8,595,387 B2
(45) Date of Patent: Nov. 26, 2013

(54) SMM-DEPENDENT GPIO LOCK FOR ENHANCED COMPUTER SECURITY

(75) Inventor: Mark A. Piwonka, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1219 days.

(21) Appl. No.: 11/259,846

(22) Filed: Oct. 26, 2005

(65) Prior Publication Data

US 2007/0130377 A1    Jun. 7, 2007

(51) Int. Cl.
*G06F 3/00*      (2006.01)
*G06F 5/00*      (2006.01)

(52) U.S. Cl.
USPC ................................. 710/14; 710/17; 710/36

(58) Field of Classification Search
USPC ............................................... 710/14, 17, 36
See application file for complete search history.

(56) References Cited

U.S. PATENT DOCUMENTS

| | | | |
|---|---|---|---|
| 6,188,602 B1* | 2/2001 | Alexander et al. | 365/185.04 |
| 6,459,313 B1* | 10/2002 | Godbee et al. | 327/161 |
| 6,990,549 B2* | 1/2006 | Main et al. | 710/306 |
| 7,278,051 B2* | 10/2007 | Mambakkam et al. | 714/6 |
| 7,305,668 B2* | 12/2007 | Kennedy et al. | 717/168 |
| 2003/0093607 A1* | 5/2003 | Main et al. | 710/306 |
| 2003/0149796 A1* | 8/2003 | Emerson et al. | 709/250 |
| 2003/0201804 A1* | 10/2003 | Waldrop | 327/112 |
| 2005/0015652 A1* | 1/2005 | Han et al. | 714/6 |

* cited by examiner

*Primary Examiner* — Zachary K Huson

(57) ABSTRACT

Computer security is enhanced by creating an environment in which changing the state of a general-purpose input/output (GPIO) output or changing the configuration of a GPIO is allowed only when authorized programs are executing. A storage device stores, responsive to a write signal, a state of a data signal. The GPIO is operable to respond to the state stored in the storage device. Control logic is operable to enable the write signal when a microprocessor in the computer is in a system management mode or a lock signal is not asserted, and to disable the write signal when the lock signal is asserted and the microprocessor is not in the system management mode.

19 Claims, 3 Drawing Sheets

| GPIO LOCK | SMIACT# | WRITES CAN OCCUR |
|---|---|---|
| 1 | 1 | NO |
| 0 | X | YES |
| X | 0 | YES |

SMM-DEPENDENT GPIO LOCK FOR ENHANCED COMPUTER SECURITY

FIELD OF THE INVENTION

This invention relates generally to computer security.

BACKGROUND

It is common for computers to include one or more general-purpose input/output devices ("GPIOs") that are accessible at input/output ("i/o") addresses. For example, a desktop computer might use a GPIO to indicate whether the enclosure of the host is physically locked or unlocked. A laptop computer might use a GPIO to indicate whether the lid of the laptop has been closed. Another GPIO might be used to enable the flashing of a BIOS memory chip or to enable one of the power planes in a printed circuit board.

GPIOs are configurable. Configuring a GPIO entails writing a configuration value to a register. Depending on the particular configuration value written, various operating characteristics of the GPIO can be determined. The GPIO can be made to operate as an input or an output, its assertion level can be set to normal or inverted, its hardware interface can be selected as open-drain or push-pull, and so on.

If a GPIO is configured to behave as an output, then the state of its output may be controlled by writing an output data value to the GPIO after the device has been configured. BIOS routines are usually responsible for configuring the GPIOs on a host platform soon after power to the host is turned on or a reset is invoked. For those GPIOs configured as outputs, the BIOS initializes the states of the outputs.

DETAILED DESCRIPTION OF THE PREFERRED EMBODIMENTS

Figure 1:
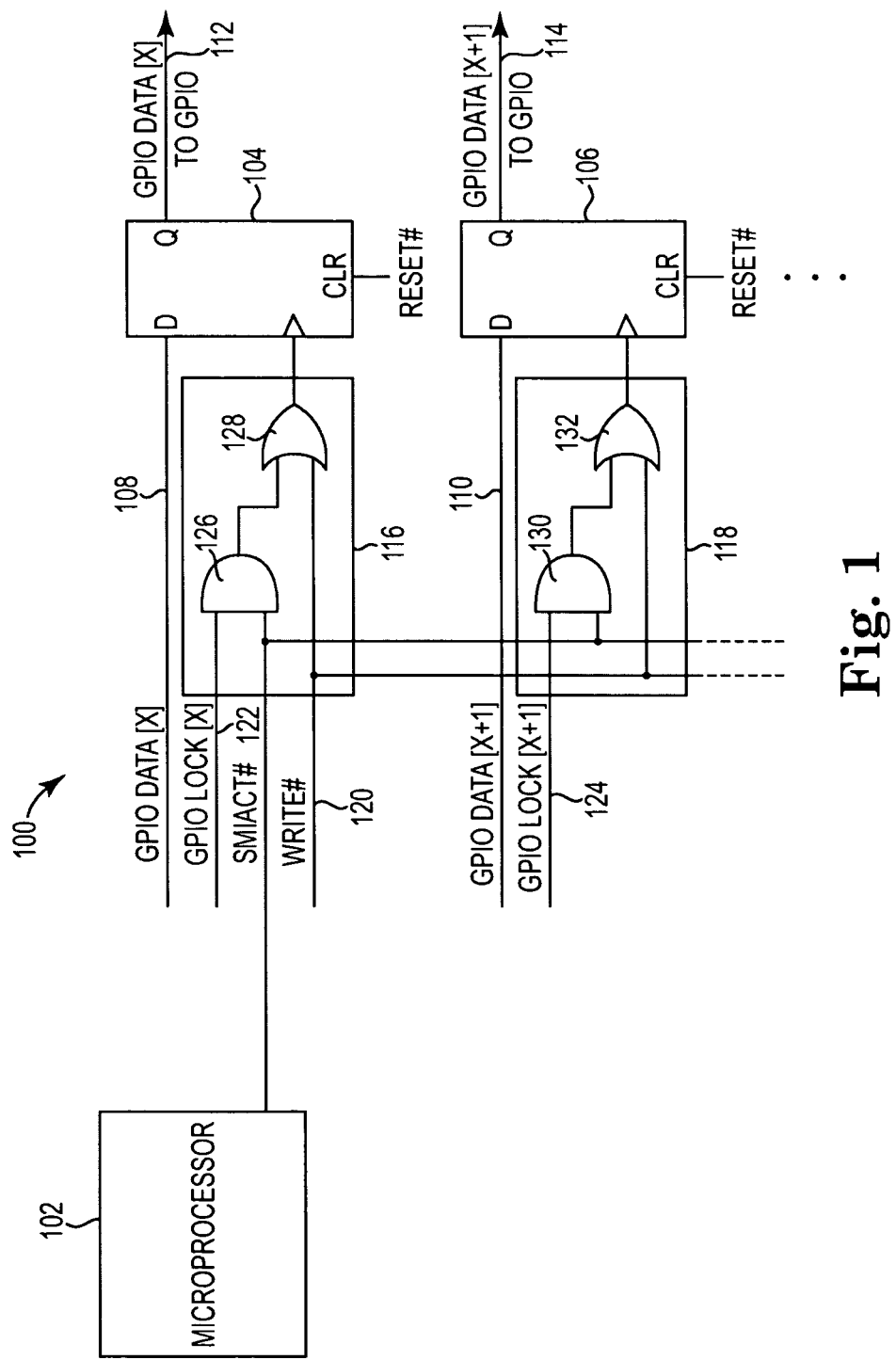
FIG. 1 is a schematic diagram of a computer that includes SMM-dependent GPIO lock circuitry according to a preferred embodiment of the invention.

Computer security can be enhanced by creating an environment in which changing the state of a GPIO output or changing the configuration of a GPIO is allowed only when authorized programs are executing. FIG. 1 illustrates relevant parts of a computer 100 configured to provide this functionality. In addition to the components illustrated in FIG. 1, computer 100 would normally also include traditional components such as main memory, one or more hard disks and possibly user i/o devices such as a keyboard, mouse and monitor.

Microprocessor 102 may be any microprocessor that includes a system management mode ("SMM"). SMM is a special-purpose operating mode intended for running system firmware as opposed to application software or general-purpose system software such as an operating system. SMM is invoked by an external system management interrupt ("SMI"). When SMM is invoked, microprocessor 102 switches to a special operating environment contained in a system management RAM ("SMRAM"). While in SMM, microprocessor 102 executes SMI handler code in SMRAM. When the SMI handler completes its operations, it executes a resume instruction, which causes microprocessor 102 to switch back to its previous mode of operation and to resume the interrupted task. SMM is transparent not only to application software, but to operating system software also. Among the microprocessors that implement an SMM are those manufactured and sold by Intel Corporation, including those in the 32-bit Intel Architecture and those in the so-called P6 family.

Computer 100 includes one or more storage devices 104, 106 for storing the state of a data signal 108, 110. An output 112, 114 of each storage device may be coupled to a conventional GPIO so that the GPIO may respond to the state of the output. For example, outputs 112, 114 may be coupled to configuration inputs of a GPIO or they may be coupled to data inputs of a GPIO. In the embodiment shown, each of outputs 112, 114 is specific to a different bit of a multi-bit GPIO. In alternative embodiments, one of outputs 112, 114 might control more than one, or all, bits of a multi-bit GPIO. Storage devices 104, 106 are configured to store the state of data signals 108, 110 in response to a write signal applied to a clock input as shown.

Logic 116 is provided to enable an assertion of asserted-low write signal 120 to reach storage device 104 when either microprocessor 102 is in SMM or when asserted-high lock signal 122 is not asserted. Logic 116 prevents an assertion of write signal 120 from reaching storage device 104 when lock signal 122 is asserted and microprocessor 102 is not in SMM. Logic 118 provides like functionality with respect to storage device 106 and asserted-high lock signal 124.

In the embodiment shown, microprocessor 102 has an asserted-low output SMIACT# that indicates, when low, that the microprocessor is in SMM and, when high, that the microprocessor is not in SMM. Logic 106 includes an AND gate 126 having an input coupled to SMIACT# and another input coupled to lock signal 122. Logic 106 also includes an OR gate 128 having an input coupled to the output of AND gate 126 and another input coupled to write signal 120. The clock input of storage device 104 is coupled to the output of OR gate 128. Logic 118 may include an AND gate 130 and an OR gate 132 configured similarly, as shown.

Figures 2, 3:
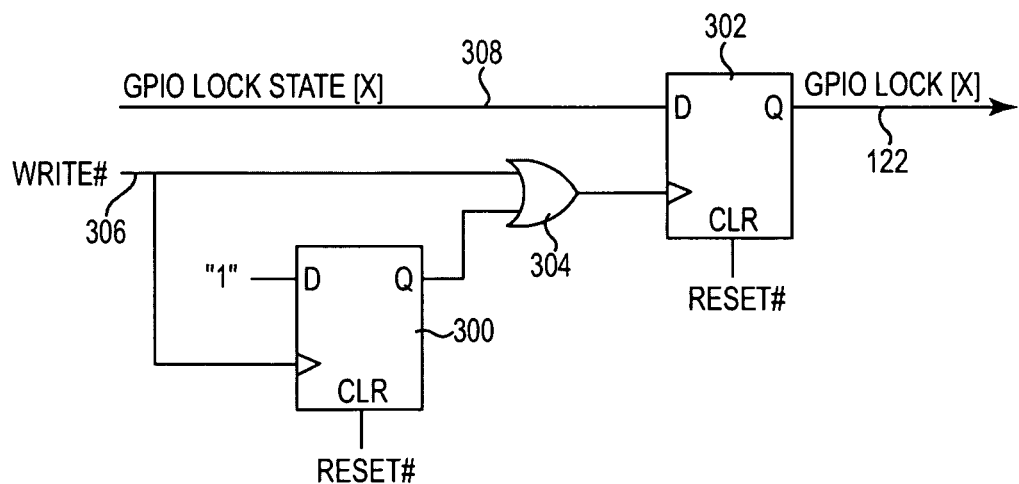
FIG. 2 is a truth table illustrating preferred behavior for the circuitry of FIG. 1.
FIG. 3 is a schematic diagram illustrating a first preferred technique for generating one of the inputs to the circuitry of FIG. 1.

The resulting operation of logic 116, 118 is in accordance with the truth table of FIG. 2. In short, writes may not occur to the storage device when both the lock signal and the SMIACT# signal are high. But writes may occur when either the lock signal is low or the SMIACT# signal is low.

In a preferred embodiment, lock signals 122, 124 follow the state of lockable storage devices whose output states can be fixed by writing a value to the lockable storage device. Once the value is so written, the output state of the lockable storage device cannot be changed except by a reset of computer 100. Any number of implementations of lockable storage devices may be used without deviating from the scope of the invention as claimed herein. Two such implementations are illustrated in FIGS. 3 and 4.

In the circuit of FIG. 3, two D flip-flops 300, 302 are employed. The D input of flip flop 300 is tied to a logical 1. The clock input of flip flop 302 is taken from OR gate 304, whose inputs are coupled to the Q output of flip flop 300 and to a write signal 306 (not necessarily the same as write signal 120). Write signal 306 is also coupled to the clock input of flip flop 300. The circuit of FIG. 3 functions as a "write-once" storage device. After a reset, the outputs of both flip flops 300, 302 are 0. A single assertion of write signal 306 may be used to cause flip flop 302 to record the state of GPIO lock state signal 308. But on the same assertion of write signal 306, the output of flip flop 300 transitions to 1. Thereafter, assertions of write signal 306 are prevented from being seen by flip flop 302. Consequently, flip flop 302 cannot be written again until a reset.

Figure 4:
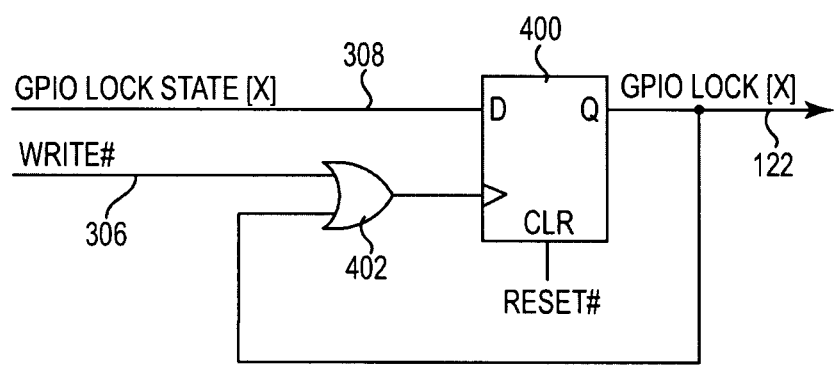
FIG. 4 is a schematic diagram illustrating a second preferred technique for generating one of the inputs to the circuitry of FIG. 1.

In the circuit of FIG. 4, a single D flip flop 400 is employed. GPIO lock signal 308 is coupled to the input of the flip flop. The clock input of the flip flop is taken from the output of OR gate 402, whose inputs are coupled to write signal 306 and to the Q output of the flip flop. This circuit functions as a "write-1-to-lock" storage device. After a reset, the Q output of flip flop 400 will remain low as long as GPIO lock signal 308 remains low (regardless of how many times write signal 306 is asserted). But as soon as write signal 306 is asserted while GPIO lock signal 308 is high, the Q output of the flip flop will go high, preventing any further assertions of write signal 306 from reaching the clock input of the flip flop. Thus, once a 1 is written into flip flop 400, the 1 will remain in the flip flop until a reset.

In preferred embodiments, one or more BIOS routines may be used shortly after computer 100 is powered on to configure the GPIOs in the system and to initialize the states of those GPIOs that are configured as outputs. Then, the BIOS may assert the lock signals. (For example, it may write appropriate values to the lockable storage devices to fix the configuration and/or the output values of the affected GPIOs.) Thereafter, only SMI handler routines will be able to change the configuration or the output values of the GPIOs in the system. This will be effective to prevent rogue application-level software, or erroneous operating system software, from causing unwanted events such as enabling an unauthorized BIOS flash, disabling a power plane, or the like.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims. For example, equivalent circuitry may be implemented using different signal assertion levels than those described herein. In such embodiments, the type and arrangement of logic gates may be modified relative to that described herein in order to produce equivalent behavior.

What is claimed is:

1. A computer, comprising:
a microprocessor having a system management mode;
a storage device for storing, responsive to a write signal, a state of a data signal;
a general-purpose input/output (GPIO) operable to respond to the state stored in the storage device, wherein the storage device is separate from the GPIO; and
logic operable to enable the write signal without system initialization or reset when either the microprocessor is in the system management mode or a lock signal is not asserted, and to disable the write signal without system initialization or reset when the lock signal is asserted and the microprocessor is not in the system management mode.

2. The computer of claim 1:
further comprising a lockable storage device; and
wherein the state of the lock signal follows an output of the lockable storage device.

3. The computer of claim 2, wherein:
the lockable storage device is a write-once storage device.

4. The computer of claim 2, wherein:
the lockable storage device is a write-1-to-lock storage device.

5. The computer of claim 1, wherein:
the lock signal is specific to one bit of the GPIO.

6. The computer of claim 1, wherein:
the data signal is a GPIO output data value.

7. The computer of claim 1, wherein:
the data signal is a GPIO configuration value.

8. The computer of claim 1, wherein:
the microprocessor has an asserted-low system management mode state output that indicates, when low, that the microprocessor is in the system management mode and, when high, that the microprocessor is not in the system management mode;
the logic comprises:
an AND gate having an input coupled to the system management mode state output and an input coupled to the lock signal; and
an OR gate having an input coupled to an output of the AND gate and an input coupled to the write signal; and
a clock input of the storage device is coupled to an output of the OR gate.

9. Apparatus for enhancing security in a computer, comprising:
a storage device for storing, responsive to a write signal, a state of a data signal;
a general-purpose input/output (GPIO) operable to respond to the state stored in the storage device, wherein the storage device is separate from the GPIO; and
logic operable to enable the write signal without system initialization or reset when a microprocessor in the computer is in a system management mode or a lock signal is not asserted, and to disable the write signal without system initialization or reset when the lock signal is asserted and the microprocessor is not in the system management mode.

10. The apparatus of claim 9:
further comprising an asserted-low system management mode state output that indicates, when low, that the microprocessor is in the system management mode and, when high, that the microprocessor is not in the system management mode; and wherein
the logic comprises:
an AND gate having an input coupled to the system management mode state output and an input coupled to the lock signal; and
an OR gate having an input coupled to an output of the AND gate and an input coupled to the write signal; and
a clock input of the storage device is coupled to an output of the OR gate.

11. The apparatus of claim 9:
further comprising a lockable storage device; and
wherein the state of the lock signal follows an output of the lockable storage device.

12. The apparatus of claim 8, wherein:
the data signal is a GPIO output data value.

13. The apparatus of claim 8, wherein:
the data signal is a GPIO configuration value.

14. Apparatus for enhancing security in a computer, comprising:
storage means for storing a value to which a general-purpose input/output (GPIO) responds, wherein the storage means is separate from the GPIO; and
means for enabling writes to the storage means without system initialization or reset when either a microprocessor in the computer is in a system management mode or a lock signal is not asserted, and for disabling writes to the storage means without system initialization or reset when the lock signal is asserted and the microprocessor is not in the system management mode.

15. The apparatus of claim 14, wherein:
the value is a GPIO output data value.

16. The apparatus of claim 14, wherein:
the value is a GPIO configuration value.

17. A method for enhancing security in a computer, the computer having a storage device with an output to which a general-purpose input/output (GPIO) responds, wherein the storage device is separate from the GPIO, the method comprising:
  enabling writes to the storage device without system initialization or reset when either a microprocessor in the computer is in a system management mode or a lock signal is not asserted; and
  disabling writes to the storage device without system initialization or reset when the lock signal is asserted and the microprocessor is not in the system management mode.

18. The method of claim 17, further comprising:
in one or more basic input/output system (BIOS) routines, writing a value to the storage device; and
asserting the lock signal.

19. The method of claim 18, wherein:
asserting the lock signal comprises writing a value to a lockable storage device.

* * * * *